US012561817B1

(12) United States Patent
Chang et al.

(10) Patent No.: US 12,561,817 B1
(45) Date of Patent: Feb. 24, 2026

(54) METHOD AND APPARATUS FOR DETERMINING THE SPEED OF TRAVEL OF ELONGATED BARS WITH SURFACE TEXTURE

(71) Applicant: OG Technologies Inc., Ann Arbor, MI (US)

(72) Inventors: Tzyy-Shuh Chang, Ann Arbor, MI (US); Hsun-Hau Huang, Ann Arbor, MI (US)

(73) Assignee: OG Technologies, Inc., Ann Arbor, MI (US)

( * ) Notice: Subject to any disclaimer, the term of this patent is extended or adjusted under 35 U.S.C. 154(b) by 0 days.

(21) Appl. No.: 18/999,032

(22) Filed: Dec. 23, 2024

(51) Int. Cl.
| | |
|---|---|
| *G06T 7/246* | (2017.01) |
| *G06T 7/73* | (2017.01) |
| *H04N 23/10* | (2023.01) |
| *H04N 25/701* | (2023.01) |

(52) U.S. Cl.
CPC ............... *G06T 7/248* (2017.01); *G06T 7/74* (2017.01); *H04N 23/10* (2023.01); *H04N 25/701* (2023.01); *G06T 2207/10024* (2013.01); *G06T 2207/30136* (2013.01)

(58) Field of Classification Search
CPC . G06T 7/248; G06T 7/74; G06T 2207/10024; G06T 2207/30136; H04N 23/10; H04N 25/701
See application file for complete search history.

(56) References Cited

U.S. PATENT DOCUMENTS

| | | | |
|---|---|---|---|
| 4,312,592 A | 1/1982 | Sabater et al. | |
| 7,889,327 B2 | 2/2011 | Sikora | |

| | | | |
|---|---|---|---|
| 7,948,613 B2 | 5/2011 | Foureault et al. | |
| 9,201,087 B2 * | 12/2015 | Della Vedova | ......... G01P 1/026 |
| 2001/0046042 A1 | 11/2001 | Theile et al. | |
| 2009/0046923 A1 * | 2/2009 | Chang | ...................... H04N 7/18 |
| | | | 382/152 |
| 2016/0082489 A1 * | 3/2016 | Studer | .................... B21B 1/163 |
| | | | 72/12.7 |

FOREIGN PATENT DOCUMENTS

| | | |
|---|---|---|
| DE | 1773534 A1 | 12/1971 |
| DE | 2133942 A1 | 1/1973 |
| DE | 2553321 A1 | 6/1977 |
| EP | 4000761 A1 | 5/2022 |
| GB | 2220744 A | 1/1990 |
| WO | 1981/003708 A1 | 12/1981 |
| WO | 2007/051699 A1 | 5/2007 |

OTHER PUBLICATIONS

Danieli Automation S.p.A. "SMS3000 Optical Speed Meter Family".
English (machine) translation of EP 4000761 A1.
English (machine) translation of DE 1773534 A1.
English (machine) translation of DE 2133942 A1.
English (machine) translation of DE 2553321 A1.
English (machine) translation of WO 2007/051699 A1.

* cited by examiner

*Primary Examiner* — Michael E Teitelbaum
(74) *Attorney, Agent, or Firm* — Reising Ethington P.C.

(57) ABSTRACT

An apparatus and method for determining a speed of travel of an elongated bar with a textured surface are provided. The apparatus includes a sensor assembly that generate signals induced by the motion of the surface texture of the elongated bar. A computing unit collects the signals and carries out the computation for the speed of travel of the bar in the direction of the sensor alignment.

13 Claims, 4 Drawing Sheets

METHOD AND APPARATUS FOR DETERMINING THE SPEED OF TRAVEL OF ELONGATED BARS WITH SURFACE TEXTURE

BACKGROUND a. Technical Field

The instant disclosure relates generally to a method and apparatus for determining the speed of travel and length of elongated bars with surface texture, specifically, the speed and length of metal reinforcement bars, also known as rebars or deformed bars. A rebar is a bar with substantial surface texture. However, the invented method and apparatus can be applied in general to bars with surface texture.

b. Background

This background description is set forth below for the purpose of providing context only. Therefore, any aspects of this background description, to the extent that it does not otherwise qualify as prior art, is neither expressly nor impliedly admitted as prior art against the instant disclosure.

Metal reinforcement bars (rebars), typically made of steel or stainless steel, are widely used in construction projects. The manufacturing process is typically hot rolling, a process of heating up metal billets, gradually reducing the cross-sectional area of the bar and changing the shape of the bar by a series of rolling stands. Rebars are delivered by either actual weight or theoretical weight, given the specified length. By specification, the difference between actual weight and theoretical weight can be as large as 7% for a given length. As a result, those rebar manufacturers who can control tightly on unit length weight, such as pound (Lb) per foot or kilogram (Kg) per meter, will enjoy a huge advantage. Thus, the ability to measure and audit the unit length weight accurately during the manufacturing process is desirable. To accomplish this, it is essential to measure the motion of the rebar, such as its moving speed or the time needed for a unit length, accurately.

Furthermore, the ability to measure the moving speed of a bar can serve as the tool to monitor the condition of the manufacturing tools. For instance, as the rebars are being rolled, the rolls may wear slowly. As a result, the aperture formed by the forming rolls, known as the bar pass in the rolling industry, may change, resulting in a change in the rebar moving speed.

There are several known approaches to determining the speed and length of rebars. One approach involves the use of two metal detectors installed at a known separation distance, known as the span, such as 20 m. The time difference of detecting the metal presence between the two metal detectors and the known separation distance can be used to calculate the moving speed by those skilled in the art. However, the drawback is obvious. This method only provides at most two readings per bar (front and end). This may be sufficient for rebars of a limited length. However, many rebars today are produced in coil form for minimum waste and at higher moving speeds (up to 90 meters per second). A coil can be several hundred or even thousand meters long. Furthermore, rebars in hot rolling are not precisely controlled. The rebars will have lateral motions and may even slightly buckle when not properly tensioned over the span, particularly for smaller sizes, such as at 10 mm or smaller.

Another known approach is to measure the moving speed and/or length by way of a speed measurement device, such as roll encoder or laser Doppler velocimeter (LDV), and integrate over time. The advantage of inline instantaneous measurement is obvious for real time process control. There are, however, issues associated with the speed measurement devices. LDV may be accurate down to +/−0.2% and requires no calibration on smooth surfaces. However, it is noisy when used on non-smooth surfaces such as the ribbed surface of rebars (which may be different from mill to mill) or when iron oxide pieces are present on the bar surface. Even though some assumptions and compensations can be made for LDV to generate speed readings, it has to be constantly calibrated once the rolls that form the ribs on rebars are changed, particularly from one manufacturer to another. Such a calibration is relatively complex, involving physically extracting a piece of rebar and manually measuring its length. As a result, the measurement accuracy is still not optimal.

Another known approach involves the use of encoders attached to a finishing roll. Ideally, one revolution of the finishing roll will generate a segment of the rebar in the length equal to the circumference of the finishing roll. Thus, theoretically a measurement device, such as an encoder attached to the finishing roll, could be used to measure the revolution of the finishing roll for length (number of revolutions) and speed (number of revolutions per second) measurement. However, bar rolling involves substantial 3D material flow. There exists substantial slippage of the hot metal to the finishing rolls, even if the roll surfaces are textured. Also, the effective diameter of the finishing roll used to calculate its circumference depends on many factors, including the metal temperature, rotating speed, rolling force, etc. Furthermore, the rolls may wear, evenly or unevenly, introducing additional variations in a production run. As a result, the measurement may not be accurate. A measuring roll with an encoder is not really feasible for hot rolling as it is impossible to guarantee 100% no slippage contact between the hot rolled bars and the measuring roll. The measuring roll may wear out over time as well.

It would be desirable to have a method and apparatus that can be used to provide near inline results with no calibration requirement.

The foregoing discussion is intended only to illustrate the present field and should not be taken as a disavowal of claim scope.

SUMMARY

The present invention is based on analysis of the signals from the surface texture of an elongated bar such as a rebar, and includes the following steps in the method: (1) positioning a first non-contact sensor $S_1$ in a predetermined location along the pass of the rebars to measure the signal and/or signal features induced by the bar surface texture, such as the ribs of a rebar; (2) positioning a second non-contact sensor $S_2$ in a second predetermined location along the pass of the rebars to measure the signal and/or signal features induced by the bar surface texture; (3) separating the sensors $S_1$, $S_2$ by a predetermined distance, denoted as $\delta$, preferably a small amount such as a distance less than 50 mm in order to limit the amount of variations of the rebar status between the two sensors such that the signals from the two sensors have substantial replication but with a time delay; (4) collecting the signals from the two sensors at a computing unit, either analog or digital, for comparison to extract the time delay, denoted as $\Delta t$, of the same signal and/or signal feature(s) induced by the surface texture between the two sensors; and (5) calculating the moving speed by $v(t)=\delta/\Delta t$ and the length by $L(t)=\int_{t_o} v(t)dt$, where $t_o$ is the time starting to count the length.

Note that the measuring speed and length would be the speed component of the measured object motion in the direction defined by the vector from the position of sensor $S_1$ to the position of sensor $S_2$, or the direction where the predetermined distance $\delta$ is measured. In the description above, the two sensors $S_1$ and $S_2$ are deposited along the pass of the rebars, but separated. That is, it is designed to measure the speed of a rebar traveling along its pass.

The foregoing and other aspects, features, details, utilities, and advantages of the present disclosure will be apparent from reading the following description and claims, and from reviewing the accompanying drawings.

DETAILED DESCRIPTION

Figure 1:
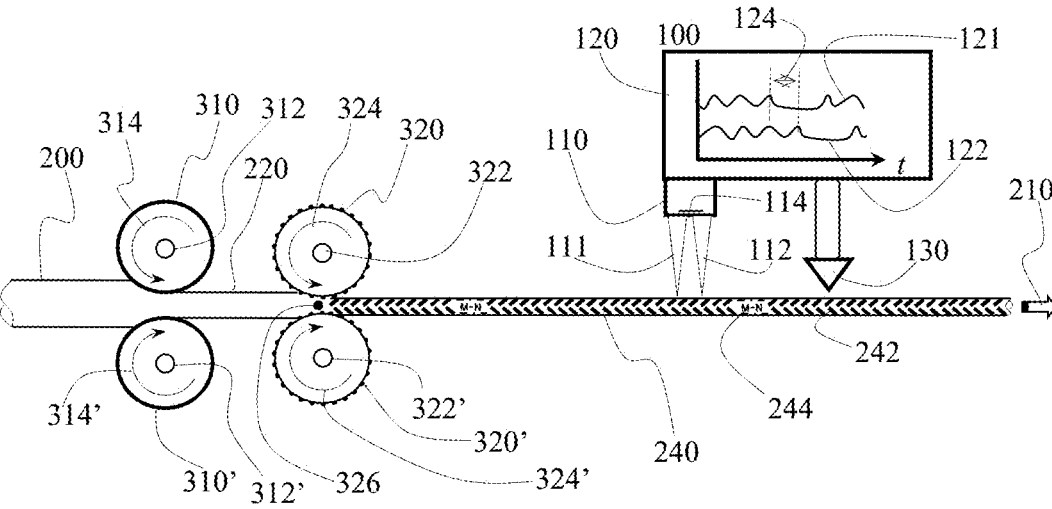
FIG. 1 is a schematic view of a system for manufacturing elongated bars such as rebar including one embodiment of an apparatus for determining a speed of travel of an elongated bar with a textured surface.

Referring now to FIG. 1, during the manufacture of and elongated bar such as rebar a piece of metal 200 is typically being heated up to a high temperature, such as 900° C. or hotter, and rolled through a train of rolling mills, collectively denoted as the rolling train 310/310', shaping the metal to its desired cross section geometry, such as round or square. The rolling train 310/310' is comprised of two rolls, rotating in the direction indicated by the arrows 314/314' with respect to the axes 312/312', respectively. The gap between the two rolls determines how much the metal piece is reduced. To balance the metal material deformation, the rotating speed of 310/310' shall be set such that the incoming metal volume per unit time equals to the outputting metal volume per unit time. This is well known to those skilled in the art of rolling. In most rolling systems, the rolls have smooth, or relatively smooth surfaces, resulting in rolled bars without a pronounced surface texture. In FIG. 1, the metal 220 coming out of the rolling train 310/310' has a surface that is substantially smooth. Note that the outputting metal 220 is smaller in dimension than the incoming metal 200.

Figure 4:
FIG. 4 is the illustrative view of a typical rebar.

To make a rebar, the pair of rolls 320/320' with surface texture is adopted as the finishing stand to deform the bar being rolled into a rebar 240. For a typical rebar, the surface texture may include ribs 242 and the manufacturer mark 244. There is not a specification of the texture, but a requirement on the rib heights and the constant cross-section area along a rebar. Thus, different manufacturers may have different texture design, and having different patterns of the ribs 242. The manufacturer mark 244 would naturally be different as it is the identification of the manufacturer. A physical rebar is shown in FIG. 4.

Referring back to FIG. 1, a non-contact apparatus 100 is deposited at a location after the finishing stand to measure the moving speed of a rebar 240 along its moving direction indicated by the arrow 210. The apparatus 100 is composed of a sensing unit 110 and a processing or computing unit 120. In the sensing unit 110, two sensors $S_1$ and $S_2$ are installed, detecting the surface texture information of the rebar 240 by way of two non-contact sensing beams, 111 and 112, respectively, while the rebar 240 is moving along the direction 210. The non-contact sensing beams 111, 112 can be waves or energy of electro-magnetic form and/or mechanical form as long as the beams have the capability to be disturbed by the motion of the texture small enough for the intended application. Electro-magnetic sensing means include, but not limited to, the detection and/or the detection of disturbances to ultraviolet radiation, visible light, infrared radiation, microwave radiation, UHF, VHF, eddy current, magnetic flux leak, and so forth. Mechanical sensing means include, but not limited to, the detection and/or the detection of disturbances to sound wave, ultrasound wave, vibrations, and so forth. The two sensing beams are deposited at the locations such that there exists a fixed separation distance 114, denoted as $\delta$. The motion of the surface texture may disturb the non-contact sensing beams and generate corresponding signals by the two sensors $S_1$ and $S_2$.

Signals generated by the two sensors are collected by the computing unit 120, which can be plotted against time. If FIG. 1, two curves plotted against time, 121 and 122, respectively, within the computing unit 120 are plotted to illustrate the concept, where curve 121 represents the signal generated by sensor $S_1$ and curve 122 represents the signal generated by sensor $S_2$. If the two curves 121 and 122 are collected with synchronization in time, we can expect the two curves to have high similarity given a small $\delta$, but with a shift in the time axis. Based on the similarity, features of the curves 121 and 122 can be identified and matched, and the difference in time, or time delay 124, denoted as $\Delta t$, from a specific feature of curve 121 to that feature of curve 122 can be obtained. Those skilled in the art shall know that even though the "feature" shown in curves 121 and 122 are visibly similar in this case for the convenience of description, the feature(s) carried in the signals, namely, curves 121 and 122, as examples, can be derived features by way of signal processing. Further, it will be understood that curves 121 and 122 are exemplary only and the representations of the signals from the sensors can assume various forms including, for example, images (2D) or data clouds (3D), without losing generality.

Figure 2:
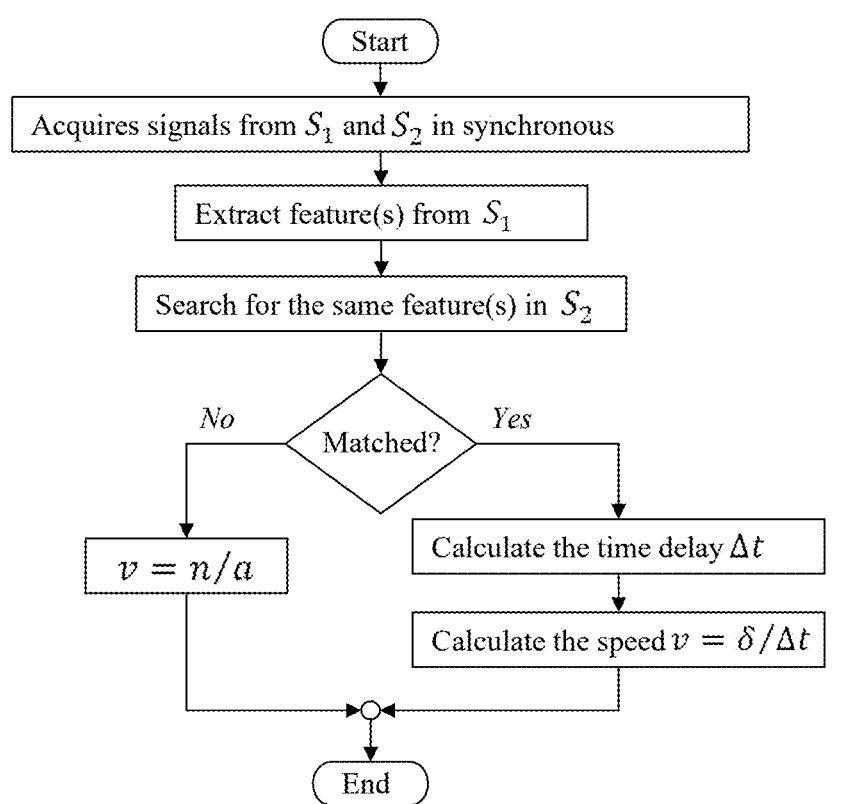
FIG. 2 is diagrammatic and block diagram view of one embodiment of a method for determining the speed of travel of an elongated bar.
Figure 3:
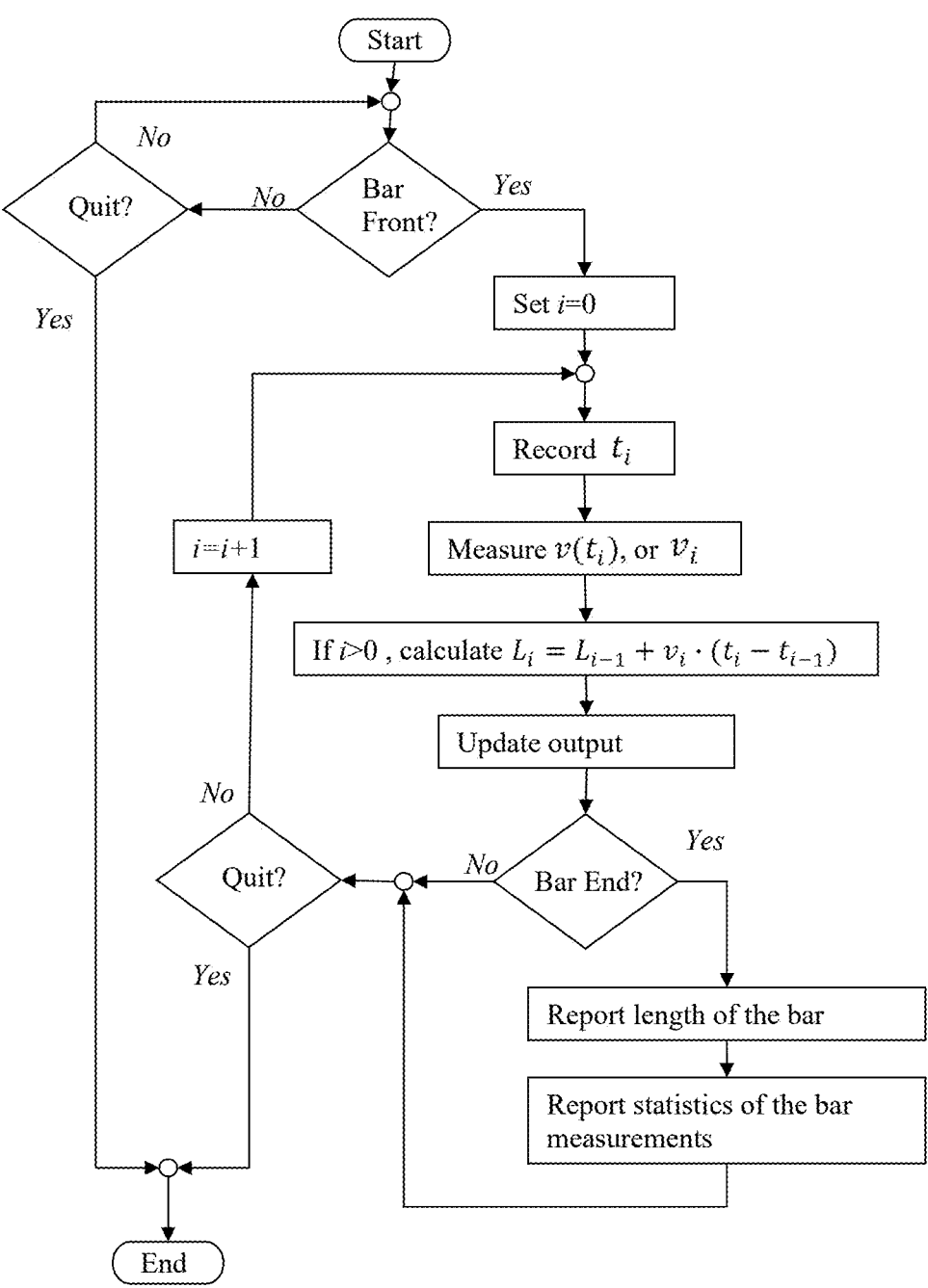
FIG. 3 is diagrammatic and block diagram view of one embodiment of a method for determining the length of an elongate bar.

With the information of $\delta$ and $\Delta t$, the computing unit 120 can generate the speed of travel of the rebar 240 by $v(t)=\delta/\Delta t$ and the length of the rebar 240 by $L(t)=\int_{t_o} v(t)dt$. FIG. 2 illustrates one embodiment of a method for determining the speed of travel $v_i=v(t_i)$ at a given time moment $t_i$ of the rebar 240. FIG. 3 illustrates one embodiment of method for determining the length of the rebar 240 using the determined speed of travel.

Referring to FIG. 2, the method for determining the speed of travel of the rebar 240 may begin with the steps of acquiring or collecting the signals from sensors $S_1$, $S_2$ and identifying common features in the signals. Feature identification can be of any known techniques such as pattern match, fitting, and so forth. Some matching techniques may result in sub-division (such as sub-pixel, in the case of images) accuracy and thus reducing the need of the scan rate requirement. Those skilled in the art shall be familiar with various sub-division methods. Features can be straightforward signal properties, and/or derived signal properties. The derived signal properties can be parameters or a set of parameters extracted through signal processing such as signal segmentation, Fourier series decomposition, wavelet analysis, principal component analysis, and so forth. The texture patterns on certain elongated bars such as rebar 240 may be repetitive resulting in potential ambiguity of multiple matching features between curves 121 and 122. Therefore, the theoretical moving speed $v_o$ and the texture pattern pitch p can be used as a reference. $v_o$ can be an estimate or can be derived from the rotating speed and diameter of the finishing rolls. p should be a design value and known. With $v_o$ and p, the computing unit 120 can adjust the scan rate in sensing signal collection to avoid the ambiguity; or, match with a group of features with spatial relations in the curves; or, be programmed to select the matching feature with a v that is closest to $v_o$ If the computing unit 120 fails to identify a common feature such that a valid speed cannot be determined or is unavailable (n/a), the computing unit 120 may be configured to output "invalid" or the previous speed, making $v_i=v_{i-1}$, as the speed of a heavy and/or continuous object, such as a steel rebar, may not change abruptly if the time interval between two measurements are kept sufficiently small. If the computing unit 120 is able to identify a common feature, the computing unit will determine the time delay 124 ($\Delta t$) based on the difference in time between when the feature appears in the signal from sensor $S_1$ relative to the time when the feature appears in the signal from sensor $S_2$. We will substantiate the required time delay accuracy. Assume the desirable measurement accuracy is $\pm\mu$, say $\pm0.1\%$ or $\pm0.001$, the predetermined distance and the measured time delay can be designed to be accurate with respect to the targeted maximum moving speed $v_\alpha$. As an example, without losing generality, let $\delta=10$ mm and $v_\alpha=100$ m/s, the requirement is to have the measured speed having a reading between 99.9 and 100.1 m/s. That is, the measured time delay shall be between 0.0000999 and 0.0001001 seconds. The difference is 0.0000002 seconds, an amount that determines the response time, typically defined as the time constant, or the scan rate (or sampling rate) of the sensors 111 and 112. Note that this may not be the same as the rate of measuring, as one measurement can be based on a burst of high scan rate signal collection. A reasonable rate of measurement generated by computing unit 120, or the rate of speed reading output from computing unit 120, would be at least 2 times per revolution of the finishing roll in order to capture the variation caused by the roll. As an example, a finishing roll has a diameter D, say 225 mm, and the perimeter is about 706 mm. At an extreme case, say $v_\alpha=100$ m/s, one revolution is about 0.007 seconds. To complete two measurements per resolution, the rate of measuring is about 280 Hz.

Once the time delay 124 ($\Delta t$) is determined, computing unit 120 determines the speed of travel responsive to time delay 124 ($\Delta t$) and the fixed separation distance 114, denoted as $\delta$. The distance $\delta$ can be measured by direct instrumentation on the sensor installation, or be calibrated by way of a known condition after the apparatus 100 is assembled. In a typical implementation, $\delta$ can be fixed and measured case by case, and can also be post calibrated once the measuring device is assembled provided that an accurately known object is available. Thus, it is acceptable to assume that $\delta$ is a constant. Then, we can formulate the requirement on the delay time measurement accuracy to be $$\varepsilon = \frac{\delta}{v_\alpha}\left(\frac{1}{1-\mu} - \frac{1}{1+\mu}\right)$$

seconds. The time constant of the sensors shall be at $\frac{1}{2}\varepsilon$ seconds or smaller, and the scan rate of the sensors shall be capable at $1/\varepsilon$ Hz or faster. The rate of measurement shall be at $2v_\alpha/\pi D$ or faster, in Hz.

Referring to FIG. 3, a method for determining the speed and length of the rebar 240 in a discrete manner is shown. The method may begin with the steps of detecting the beginning or front of the rebar 240. Referring to FIG. 1, a metal detector 130 of high response time, preferably same as that of the sensors $S_1$ and $S_2$, can be integrated to detect the front and tail ends of the rebar and define beginning and end times $t_o$ and $t_e$. $t_o$ and $t_e$ can also be defined by a digital input, such as a digital ON/OFF signal sent from a rolling control unit. There is also a possibility that sensors $S_1$ and $S_2$ be used as the metal detector in determining $t_o$ and $t_e$ by processing signals 121 and 122. Referring again to FIG. 3, the method may continue with the steps of determining the speed of travel of the rebar using, for example, the method in illustrated in FIG. 2 and subsequently determining length responsive to the speed of travel. Because the speed v(t) can be measured in discrete moments, the length measurement can be changed to a discrete form, as $L_i=\Sigma_{i=0} v_i/\rho_i$, where $v_i=v(t_i)$ and $\rho_i$ is the rate of measurement at the instance $t_i$, i=0, 1, 2, 3, . . . . If the rate of measurement is constant, then $L_i=\Sigma_{i=0} v_i/\rho$. Or, it can be $L_i=\Sigma_{i=0} v_i \cdot (t_i-t_{i-1})$, when i>0. The length of a completed rebar can be calculated as $L=\int_{t_o}^{t_e} v(t)dt$, or $$L = \sum_{i=0}^{n} v_i / \rho_i.$$

Once the end of the bar is reached, the method may conclude by reporting the length of the rebar 240 and other statistics associated with the various measurements (speed of travel, length) obtained by computing unit 120. Computing unit 120 can be configured to deliver the results, such as the speed reading and or length integrated from $t_o$, by many standard output formats such as, but not limited to, screen display for visual observation, channels of analog signals with defined protocols, and/or channels of digital signals with defined protocols. The display can be a monitor, a TV, a flat panel, color or black and white. The analog channels can be based on current or voltage. The digital channels can be parallel ports, serial ports, network communication, wired or wireless, and so forth.

Figure 5:
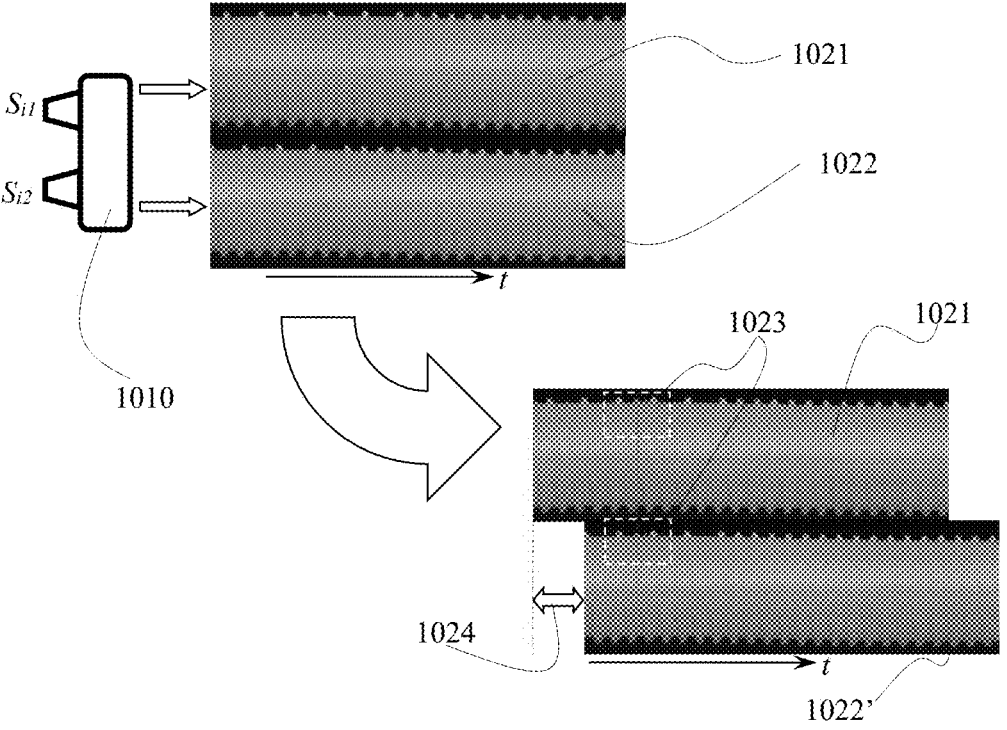
FIG. 5 is an illustrative example of steps in one embodiment of a method for determining the length of an elongate bar and, in particular, image matching of a rebar.

Referring now to FIG. 5, in a specific embodiment of an apparatus for determining a speed of travel of an elongate bar, the sensors $S_1$, $S_2$ comprise two imaging devices capable of very high frequency image acquisition. In this embodiment, the imaging devices can be of a linear form, also known as line scans, or an area form, also known as area scans. The additional dimension of the data (2D images) in theory provides much more feature identification stability and accuracy than one-dimension signals. Images can be decomposed into many features. The ability of sub-pixel accuracy of pattern and/or feature matching may also reduce the need of high scanning frequency. Referring to FIG. 5, in this embodiment, synchronized images will be taken from the imaging sensors $S_{i1}$ and $S_{i2}$, denoted as the images 1021 and 1022, respectively based on any lighting that can result in images with information of surface textures, such as, but not limited to reflective lighting (bright field or dark field, or cloudy day, etc., surface textures) or back lighting (surface texture on edges). Note that $S_{i1}$ is deposited in front of $S_{i2}$ with respect to the traveling direction of the rebar. Computing unit 120 processes the images to identify the same features/patterns, such as the block by the dash line rectangle 1023. Once identified, the same feature/pattern will be lined up by shifting image 1022, shown as 1022'. The shift will generate a pixel offset 1024. The amount of pixels in the offset 1024, times the inverse of the scanning rate will result in the time delay Δt.

Figure 6:
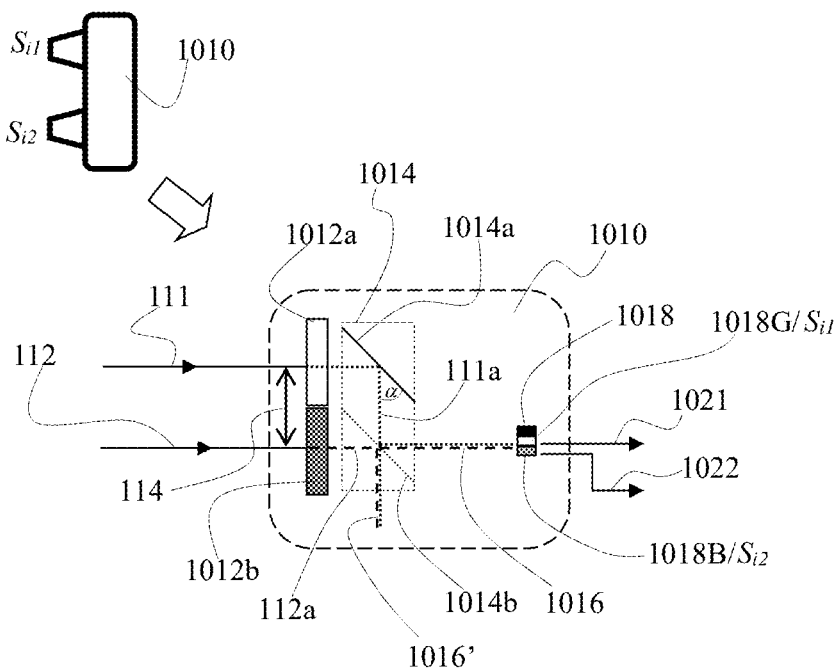
FIG. 6 is a one embodiment of an apparatus for determining a speed of travel of an elongated bar with a textured surface.

Referring now to FIG. 6, in another embodiment of an apparatus for determining a speed of travel of an elongate bar, the sensors $S_1$, $S_2$ in sensor assembly 1010 are formed from an imaging device with multiple lines, such as a color line scan imaging device. The benefit of this implementation would be the chip-level synchronization of imaging (typically in nanosecond level) and chip-level sensor alignment accuracy (typically in nanometer level). For a color line scan imaging device, the typically implementation is three lines of imaging pixels with each line being covered by a color filter, typically in RGB (red, green and blue). Those skilled in the art shall appreciate the possibility to separate the signaling light beam by way of different colors, or different wavelengths as long as the two selected wavelengths or wavelength spans are substantially separable for differentiation.

In the illustrated embodiment, sensor assembly 1010 delivers the radiation from two positions to the collocated imaging sensors. Radiation emitted from, or reflected by, the rebar 240 is transmitted in a beam 111 from a surface location on the rebar 240 and carries information about the surface texture of the rebar 240. The radiation contains at least the selected wavelength(s) matching the capability of conditioning by the filter 1012a. Filter 1012a passes a portion of the radiation primarily having wavelengths within a first range of wavelengths as the surface location on the rebar 240 passes a viewing window of the filter 1012a. Similarly, radiation emitted from, or reflected by, the rebar 240 is transmitted in a beam 112 from the surface location on the rebar 240 and carries information about the surface texture of the rebar 240. The radiation contains at least the selected wavelength(s) matching the capability of conditioning by the filter 1012b. Filter 1012b passes a portion of the radiation primarily having wavelengths within a second range of wavelengths as the surface location on the rebar 240 passes a viewing window of the filter 1012a. Filters 1012a, 1012b are configured such that the portion of the radiation passed by filter 1012a and having wavelengths with a first range of wavelengths and the portion of radiation passed by filter 1012b and having wavelengths within a second range of wavelengths are not identical, but may, in some embodiments, partially overlap. The first range of wavelengths includes a first subset of wavelengths which is substantially excluded from the second range of wavelengths and the second range of wavelengths includes a second subset of wavelengths which is substantially excluded from the first range of wavelengths. In one embodiment, substantially excluded means that the first subset of wavelengths that is substantially excluded from the second range of wavelengths means the intensity of the first subset of wavelengths within the second portion of radiation is less than or equal to 20% of the intensity of the second range of wavelengths in the second portion of radiation and the second subset of wavelengths that is substantially excluded from the first range of wavelengths means the intensity of the second subset of wavelengths within the first portion of radiation is less than or equal to 20% of the intensity of the first range of wavelengths in the first portion of radiation. The radiation in beams 111, 112 may be radiation emitted by the rebar 240 (e.g., as a result of heating) or radiation that is generated from a radiation source (e.g., a light) and that engages with and is modified by the rebar 240. The radiation source may direct radiation towards the surface location on the rebar 240. Alternatively, the rebar 240 may be back-lit with the radiation source directing radiation towards a surface of the elongated bar diametrically opposite the surface location. In the latter case, beams 111, 112 can be the residual radiations from the background not blocked by the rebar 240. To separate the two beams 111 and 112 for the designed light propagating paths, filters 1012a and 1012b are deposited in the predetermined positions and, in particular, filter 1012b is spaced from filter 1012a a by a known distance. Filters 1012a, 1012b produce radiation beams 111a, 112b, respectively, which only carry selected wavelengths of the corresponding radiation beams 111 and 112. In one embodiment, filter 1012a passes radiation having wavelengths associated with the color green while filter 1012b passes radiation having wavelengths associated with the color blue, but it should be understood that this is for illustration without losing generality. Beam 111a carrying wavelengths associated with the color green carries only a portion of the radiation from beam 111 and wavelengths associated with the color blue from beam 111 are substantially suppressed. Similarly, beam 112a carrying wavelengths associated with the color blue carries only a portion of the radiation from beam 112 and wavelengths associated with the color green from beam 112 are substantially suppressed.

Radiation beams 111a, 112b are separated by a distance 114 and, at any given point in time, represent the information relating to surface textures at different locations on rebar 240. The rebar 240, however, is expected to move during production such that the same surface location on rebar 240 produces radiation beams 111/111a and later produces radiation beams 112/112a. Referring again to FIG. 6, the apparatus further includes means 1014, such as a reflective surface 1014a and a beamsplitter 1014b, for combining the first and second portions of radiation 111a, 112a into a combined radiation beam 1016. Those skilled in the art shall know that the combined radiation beam 1016 shall be substantially a single beam with beam 111a and 112a overlapping. For illustration purpose, combined radiation beam 1016 is plotted with a small separation to show the content in the beam from each of beams 111a, 112a. Reflective surface 1014a bends the beam 111a towards the path of the beam 112a. The bending angle may be 180° minus 2α, where α is the angle between the reflecting surface 1014a and the beam 111a. Beamsplitter 1014b is positioned such that both the beams 111a and 112a impinge on substantially the same spot on the beamsplitter 1014b. Those skilled in the art shall know that the two detecting beams 111a and 112a will be merged into one beam 1016 as long as the reflecting surface 1014a and the beamsplitter 1014b are parallel to each other. However, the best and easiest implementation would be keeping both with α being 45 degrees to the detecting beams 111a and 112a. This may result in the smallest envelope for the combining means 1014 for a given separation distance 114. In fact, in one embodiment, the combining means may comprise a lateral displacement beamsplitter which is typically used to split one beam into two parallel beams. After the beams 111a and 112a impinge the beamsplitter 1014b, a portion of each beam 111a and 112a is merged to be the combined radiation beam 1016. Those skilled in the art shall know the other portion of the beams 111a and 112a will form another beam 1016' that is discarded. The portion of the beams 111a and 112a merged into the detecting beam 1016 depends on the optical property of the beamsplitter 1014b. A 50-50 beamsplitter will result in 50% of beam 111a and 50% of beam 112a being merged into beam 1016. A 40-60 beamsplitter will result in 40% of beam 111a and 60% of beam 112a being merged into beam 1016. The designer may select the right beamsplitting property based on optical properties of the other components, such as the wavelength intensity content of the beams 111 and 112, and the imaging pixel sensitivity of the line scan imaging device to different wavelengths, among others. Although beam 111a impinges on the reflective surface 1014a in the illustrated embodiment, those skilled in the art shall also understand that the use of the reflective surface 1014a and beamsplitter 1014b may be conveniently reversed such that the detecting beam 112a is bent by the reflective surface 1014a toward the path of the detecting beam 111a, and the beams 111a and 112a are merged at the beamsplitter 1014b.

The composite detecting beam 1016 is sent to a line scan imaging device 1018. Device 1018 includes at least two lines of pixels 1018G and 1018 B conditioned to receive radiation having different ranges of wavelengths. For example, device 1018 may comprise a color line scan imaging device having three lines of pixels, conditioned to receive radiation having wavelengths corresponding to red, green and blue light. The two lines of pixels 1018G and 1018B in device 1018 serve as the imaging sensors $S_{i1}$ and $S_{i2}$ referenced in FIG. 5. A first line of pixels 1018G is configured to receive a portion of the combined radiation beam 1016 corresponding to at least a portion of the first subset of wavelengths found in radiation beam 111a based on the matching optical property between the line of pixels 1018G and filter 1012a, but is not configured to receive the portion of the combined radiation beam 1016 corresponding to the second subset set of wavelengths found in radiation beam 112a. A second line of pixels 1018 B is configured to receive another portion of the combined radiation beam 1016 corresponding to at least a portion of the second subset of wavelengths found in radiation beam 112a based on the matching optical property between the line of pixels 1018B and filter 1012b, but is not configured to receive the portion of the combined radiation beam 1016 corresponding to the first subset set of wavelengths found in radiation beam 111a. Those skilled in the art shall know that another implementation is to have the filter 1012a complementary to the optical property of the line of pixels 1018B, instead of matching the optical property of the line of pixels 1018G. In this case, the beam 111a will carry not only the wavelengths to be received by the line of pixels 1018G, but also other wavelengths except for those that could be received by the line of pixels 1018B. Similarly, the filter 1012b can be complementary to the optical property of the line of pixels 1018G, instead of matching the optical property of the line of pixels 1018B. Note that the number of pixels in each line of pixels 1018G, 1018 B may be of any arbitrary natural number. Typical numbers include 512, 1024, 2048, etc. Nevertheless, there is nothing wrong for the number of pixels in each line to be 1 or any natural number. In the case the number of pixels in each line is 1, the output may not be considered images, but signals 121 and 122 as in FIG. 1, representing the intensity of radiation beams 111a and 112a, respectively, over time.

Device 1018 is configured to synchronously generate a multiple-band image responsive to the combined radiation beam 1016 including a first band from the first line of pixels 1018G and a second band from the second line of pixels 1018B. In the illustrated embodiment employing a color line scan imaging device, one the device 1018 receives the combined radiation beam 1016, device 1018 will generate a color image from which the signal images 1021 and 1022 (see also FIG. 5) can be obtained by extracting monochrome images from the individual color (e.g. green and blue) bands of the color image. In particular, computing unit 120 (FIG. 1) may be configured (e.g., with appropriate programming instructions (i.e., software)) to perform several image processing actions in response to the multiple-band image generated by device 1018 and several computational steps to determine the speed of travel of the rebar 240 and length of the rebar 240. Computing unit 120 may first extract first and second monochrome images 1021, 1022 from the multiple-band image generated by device 1018 with the first monochrome image 1021 corresponding to the radiation received from the surface location of the rebar 240 as the surface location passed the filter 1012a and the second monochrome image 1022 corresponding to the radiation received from the surface location of the rebar 240 as the same surface location passed the filter 1012b. Computing unit 120 then identifies a position of the surface location in each of the first and second monochrome images 1021, 1022 using conventional pattern/feature matching techniques as described hereinabove. Referring again to FIG. 5, computing unit 120 then determine a pixel offset 124 between the positions of the surface location in the first and second monochrome images 1021, 1022 by offsetting the images 1021, 1022'. Computing unit 120 uses the pixel offset 124 to determine a time difference or time delay Δt between the appearance of the surface location at the viewing windows of the filters 1012G, 1012B. Computing unit 120 can determine the speed of travel of rebar 240 responsive to the time difference Δt and the distance 114 and, subsequently, the length of the rebar 240 using the methodologies described hereinabove in FIGS. 2-3.

For the convenience and the availability of components, an embodiment has been described and illustrated employing two filters 1012G, 1012B configured to pass wavelengths corresponding to two different colors (green and blue) that match or complement the lines of pixels in a color line scan imaging device 1018. Those skilled in the art, however, shall understand that the filters and imaging device may be configured to pass and receive any practically differentiable wavelengths (e.g., two sets of wavelengths corresponding to different shades of blue) as long as the combination of the filters before the reflector/beamsplitter and the filters in front of the lines of pixels on the imaging device 1018 supports the selection of wavelengths being received by the lines of pixels. Even though the embodiment described and illustrated herein utilizes radiation having wavelengths corresponding to green and blue, wavelengths corresponding to other colors including red could be used (avoiding red may, however, be good for hot objects, like steel bars at 1,000 C). Those skilled in the art shall also appreciate that the use of color and/or wavelength filtering for separation can be considered a special instance of the use of electro-magnetic radiations with signal modulation/demodulation. That is, the disclosed inventive embodiment can be extended to the use of any electro-magnetic radiations with proper modulation/demodulation.

Those skilled in the art shall also know that the actual implementation of the inventive apparatus may involve additional components such as radiation sources (e.g. lighting), lenses and other elements for focusing the radiation and mounting or support structures (fixtures) not shown or disclosed in the present description. Nevertheless, this shall not prevent the implementation of this invention with focusing devices to improve the signal resolving capability associated with the detecting sensors.

What is claimed is:

1. An apparatus for determining a speed of travel of an elongated bar with a textured surface, comprising:

a first filter configured to pass a first portion of radiation received from a surface location on the elongated bar as the surface location passes a viewing window of the first filter, the first portion of radiation primarily having wavelengths within a first range of wavelengths;

a second filter configured to pass a second portion of radiation received from the surface location on the elongated bar as the surface location passes a viewing window of the second filter, the second portion of radiation primarily having wavelengths within a second range of wavelengths, the first range of wavelengths including a first subset of wavelengths which is substantially excluded from the second range of wavelengths and the second range of wavelengths including a second subset of wavelengths which is substantially excluded from the first range of wavelengths, and the second filter spaced from the first filter by a distance;

means for combining the first and second portions of radiation into a combined radiation beam;

a line scan imaging device having first and second lines of pixels, the first line of pixels configured to receive a portion of the combined radiation beam corresponding to at least a portion of the first subset of wavelengths and the second line of pixels configured to receive another portion of the combined radiation beam corresponding to at least a portion of the second subset of wavelengths, the line scan imaging device configured to synchronously generate a multiple-band image including a first band from the first line of pixels and a second band from the second line of pixels; and a computing unit configured to extract first and second monochrome images from the multiple-band image with the first monochrome image corresponding to the radiation received from the surface location of the elongated bar as the surface location passed the first filter and the second monochrome image corresponding to the radiation received from the surface location of the elongated bar as the surface location passed the second filter, identify a position of the surface location in each of the first and second monochrome images, determine a pixel offset between the positions of the surface location in the first and second monochrome images, determine a time difference responsive to the pixel offset, and determine the speed of travel responsive to the time difference and the distance.

2. The apparatus of claim 1 wherein the line scan imaging device is a color line scan imaging device and the first range of wavelengths corresponds to a first color captured by the color line scan imaging device and the second range of wavelengths corresponds to a second color captured by the color line scan imaging device.

3. The apparatus of claim 1 wherein the multiple-band image is a color image including a first band of a first color and a second band of a second color.

4. The apparatus of claim 1 wherein the radiation received from the surface location on the elongated bar includes radiation emitted by the elongated bar.

5. The apparatus of claim 1 wherein the radiation received from the surface location on the elongated bar includes radiation generated from a radiation source and modified by the elongated bar after engaging with the elongated bar.

6. The apparatus of claim 5 wherein the radiation generated from the radiation source and modified by the elongated bar is directed from the radiation source towards the surface location on the elongated bar.

7. The apparatus of claim 5 wherein the radiation generated from the radiation source and modified by the elongated bar is directed from the radiation source towards a surface of the elongated bar diametrically opposite the surface location on the elongated bar.

8. The apparatus of claim 1 wherein the radiation received from the surface location on the elongated bar includes at least one of ultraviolet radiation, visible light, infrared radiation and microwave radiation.

9. The apparatus of claim 1 wherein the means for combining the first and second portions of radiation includes:

a reflective surface configured to redirect the first portion of radiation; and, a beam splitter configured to receive the first portion of radiation redirected by the reflective surface and the second portion of radiation and to output the combined radiation beam.

10. The apparatus of claim 1 wherein the means for combining the first and second portions of radiation comprises a lateral displacement beam splitter.

11. The apparatus of claim 1 wherein the said line scan imaging device includes a focusing device.

12. The apparatus of claim 1 wherein the first subset of wavelengths that is substantially excluded from the second range of wavelengths means the intensity of the first subset of wavelengths within the second portion of radiation is less than or equal to 20% of the intensity of the second range of wavelengths in the second portion of radiation, and the second subset of wavelengths that is substantially excluded from the first range of wavelengths means the intensity of the second subset of wavelengths within the first portion of radiation is less than or equal to 20% of the intensity of the first range of wavelengths in the first portion of radiation.

13. A method of determining a speed of travel of an elongated bar with a textured surface, comprising:

moving one of a filter assembly and the elongated bar relative to the other, the filter assembly including a first filter configured to pass a first portion of radiation received from a surface location on the elongated bar as the surface location passes a viewing window of the first filter, the first portion of radiation primarily having wavelengths within a first range of wavelengths; and, a second filter spaced from the first filter by a distance and configured to pass a second portion of radiation received from the surface location on the elongated bar as the surface location passes a viewing window of the second filter, the second portion of radiation primarily having wavelengths within a second range of wavelengths wherein the first range of wavelengths includes a first subset of wavelengths which is substantially excluded from the second range of wavelengths and the second range of wavelengths includes a second subset of wavelengths which is substantially excluded from the first range of wavelengths;

combining the first and second portions of radiation into a combined radiation beam;

directing the combined radiation beam towards a line scan imaging device having first and second lines of pixels, the first line of pixels configured to receive a portion of the combined radiation beam corresponding to at least a portion of the first subset of wavelengths and the second line of pixels configured to receive another portion of the combined radiation beam corresponding to at least a portion of the second subset of wavelengths, the line scan imaging device configured to synchronously generate a multiple-band image including a first band from the first line of pixels and a second band from the second line of pixels;

extracting first and second monochrome images from the multiple-band image with the first monochrome image corresponding to the radiation received from the surface location of the elongated bar as the surface location passed the first filter and the second monochrome image corresponding to the radiation received from the surface location of the elongated bar as the surface location passed the second filter;

identifying a position of the surface location in each of the first and second monochrome images;

determining a pixel offset between the positions of the surface location in the first and second monochrome images;

determining a time difference responsive to the pixel offset, and, determining the speed of travel responsive to the time difference and the distance.

* * * * *